P. J. HOVLAND.
SPRING WHEEL.
APPLICATION FILED OCT. 14, 1908.
963,565.
Patented July 5, 1910.
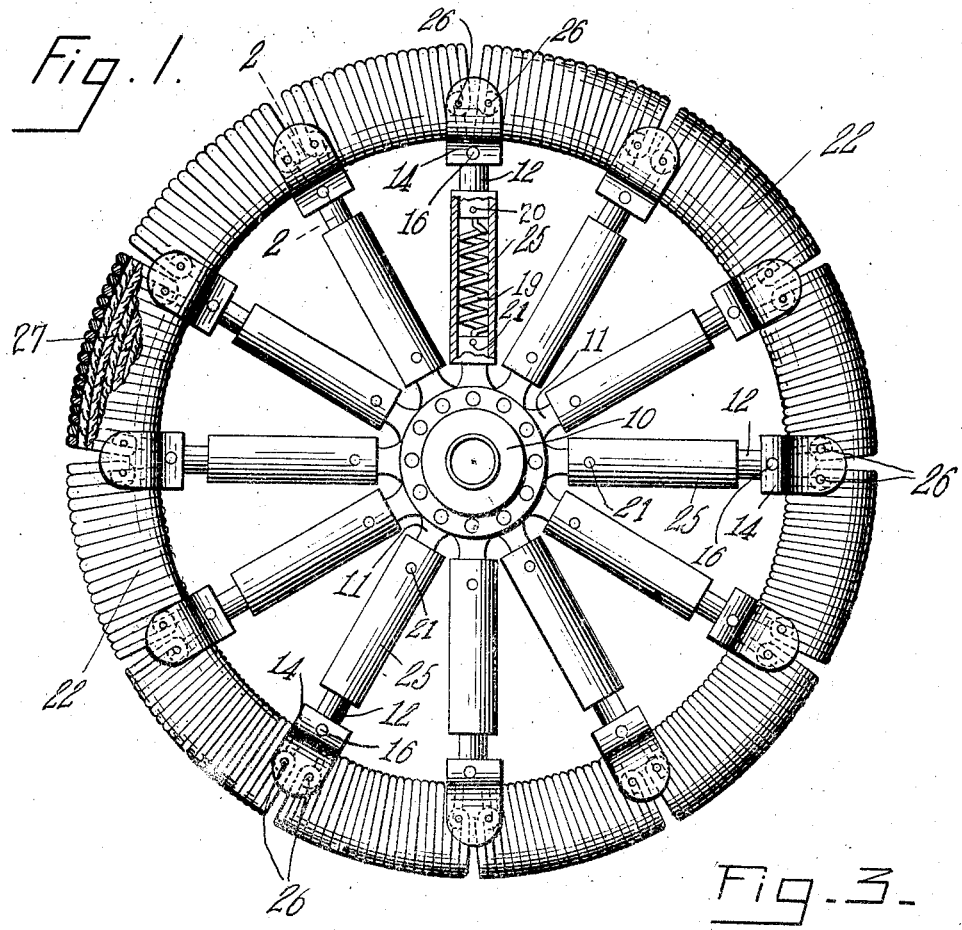
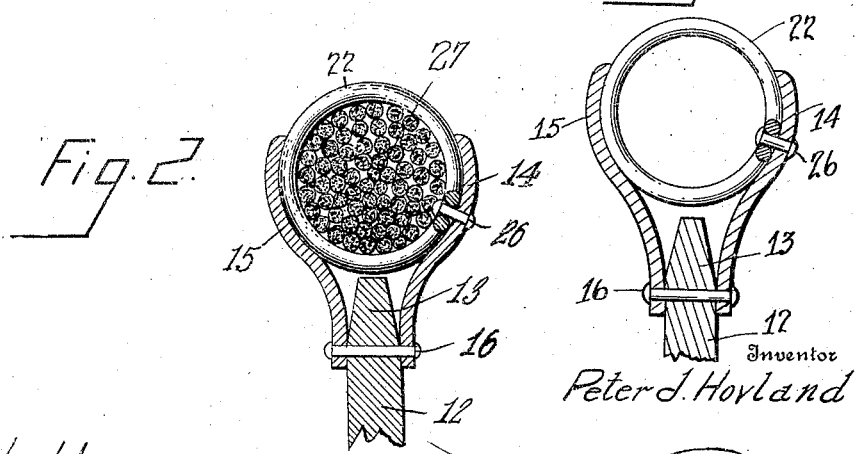
Witnesses
C. R. Hardy
C. N. Woodward
Inventor
Peter J. Hovland
By Chandler & Chandler
Attorney

UNITED STATES PATENT OFFICE.

PETER J. HOVLAND, OF KENNETH, MINNESOTA.

SPRING-WHEEL.

963,565.

Specification of Letters Patent.

Patented July 5, 1910.

Application filed October 14, 1908. Serial No. 457,702.

*To all whom it may concern:*

Be it known that I, PETER J. HOVLAND, a citizen of the United States, residing at Kenneth, in the county of Rock, State of Minnesota, have invented certain new and useful Improvements in Spring-Wheels; and I do hereby declare the following to be a full, clear, and exact description of the invention, such as will enable others skilled in the art to which it appertains to make and use the same.

This invention relates to improvements in vehicle wheels, and more particularly to the class known as spring wheels, and has for one of its objects to improve the construction and increase the efficiency and utility of devices of this character.

Another object of the invention is to provide a simply constructed wheel having a resilient rim formed in sections and resilient spokes, the spokes being coupled to the rim and the hub, so that when worn or impaired one or more of the sections of the rims or one or more of the spokes may be renewed without discarding the remainder of the wheel.

With these and other objects in view the invention consists in certain novel features of construction as hereinafter shown and described and specifically pointed out in the claims, and in the drawings illustrative of the preferred embodiment of the invention.

Figure 1 is a side elevation partly in section. Fig. 2 is a section enlarged on the line 2—2 of Fig. 1. Fig. 3 is a view similar to Fig. 2 illustrating the construction without the flexible filling material.

The improved wheel comprises a hub portion, which may be constructed in any desired manner, but for the purpose of illustration, an ordinary conventional hub, represented at 10, is provided with the usual number of radially disposed spokes 11, the latter being relatively short and with the outer portions formed with parallel sides, as shown.

The rim of the wheel is formed of a plurality of sections of coiled wire, with their confronting ends connected to the spoke elements of the wheel, as hereafter explained.

Arranged at intervals between the rim and the hub are a plurality of rods 12, the rods equal in number to the spoke elements 11 and arranged in longitudinal alinement therewith as shown. The outer end of each rod is reduced or tapered as shown at 13, and attached to the sides of each rod are clamp members 14—15, the clamp members riveted or otherwise secured at 16 to the rods and with their outer ends curved to conform to the outer surface of the rim, the curved portions extending beyond the center of the rim so that the latter will be firmly held between the clamping members.

Arranged between the confronting ends of each of the spoke elements 11 and its rods 12 is a spring 19, the outer end of each spring secured, preferably by riveting as shown at 20, to the rod, and the inner end secured preferably by riveting at 21 to the spoke element. Surrounding the outer end of each of the spokes 11 and the inner end of each of its corresponding rods 12 is a sleeve 25, the sleeve coacting with the spoke and the rod and the spring to retain the parts in position. By this means the rim 22 is firmly coupled yieldably to the hub at intervals corresponding to the spoke elements 11.

As before mentioned the rim is formed of a plurality of coils of wire 22 arranged end to end with the ends of the coils bearing between the clamp members 14—15, the terminal helix of each coil being riveted as shown at 26 to one of the clamp plates. By this means in event of the breakage or impairment of one or more of the coiled sections 22 the impaired section may be readily detached by driving out the rivets 26 by which it is connected to the clamp plates 14, and inserting a new coil section, and without discarding or interfering with the remainder of the wheel. This is an important advantage in the improved device, as will be obvious.

The improvements herein described may be readily applied to wheels of various sizes and to wheels employed for various purposes, but is more particularly applicable to wheels of automobiles, and similar vehicles.

The resilient rim members may be provided with a core of flexible elements such as rope or the like which will effectually prevent rattling or looseness while at the same time not interfering with the yieldableness of the structure, and for the purpose of illustration this filling material is represented at 27, but it will be understood that the invention is not necessarily limited to the employment of filling material, and the latter may be employed or dispensed with as preferred.

What is claimed is—

1. A vehicle wheel comprising a hub, a yieldable rim formed from a plurality of helically wound sections arranged end to end, a plurality of yieldable spokes, and a clamping means between each of said spokes and the confronting ends of two of said helical rim sections.

2. In a vehicle wheel including a hub and a plurality of spoke elements radiating from said hub, a yieldable rim formed of a plurality of helically wound sections arranged end to end, and a plurality of clamp devices formed of plates arranged in pairs and bearing upon opposite sides of said rim section, and of said spokes, said clamping plates being connected to the rim sections.

3. A vehicle wheel comprising a hub, a yieldable rim formed of a plurality of helically wound sections arranged end to end, a plurality of yieldable spokes, and a clamping member for each of said spokes, said clamping members being connected to the spokes and rim sections.

In testimony whereof, I affix my signature, in presence of two witnesses.

PETER J. HOVLAND.

Witnesses:
 CARL G. PENN,
 WILL ROBER.